(12) United States Patent
Ryon et al.

(10) Patent No.: US 11,226,103 B1
(45) Date of Patent: Jan. 18, 2022

(54) HIGH-PRESSURE CONTINUOUS IGNITION DEVICE

(71) Applicant: Delavan Inc., Des Moines, IA (US)

(72) Inventors: Jason Ryon, Carlisle, IA (US); Lev Alexander Prociw, Johnston, IA (US); Brandon P. Williams, Johnston, IA (US)

(73) Assignee: Delavan Inc., Des Moines, IA (US)

( * ) Notice: Subject to any disclaimer, the term of this patent is extended or adjusted under 35 U.S.C. 154(b) by 0 days.

(21) Appl. No.: 17/123,778

(22) Filed: Dec. 16, 2020

(51) Int. Cl.
| F23R 3/00 | (2006.01) |
| F23R 3/28 | (2006.01) |
| F02C 3/04 | (2006.01) |
| F02C 7/264 | (2006.01) |

(52) U.S. Cl.
CPC ............... F23R 3/286 (2013.01); F02C 3/04 (2013.01); F02C 7/264 (2013.01); F05D 2240/35 (2013.01); F05D 2260/99 (2013.01)

(58) Field of Classification Search
None
See application file for complete search history.

(56) References Cited

U.S. PATENT DOCUMENTS

| 2,540,642 A | 2/1951 | Allen et al. |
| 2,541,900 A | 2/1951 | Frederick |
| 2,645,082 A | 7/1953 | Sarto |
| 2,648,951 A | 8/1953 | McDougal |
| 2,811,676 A | 10/1957 | Wytze |
| 2,840,742 A | 6/1958 | Watters |
| 2,885,859 A | 5/1959 | Barberis |
| 2,958,196 A | 11/1960 | Wie et al. |
| 3,009,321 A | 11/1961 | Jones et al. |
| 3,487,636 A | 1/1970 | Scott et al. |
| 3,954,389 A | 5/1976 | Szetela |
| 3,990,834 A | 11/1976 | Dubell et al. |
| 4,012,904 A | 3/1977 | Nogle |
| 4,099,373 A | 7/1978 | Griffin et al. |
| 4,112,675 A | 9/1978 | Pillsbury et al. |
| 4,194,358 A | 3/1980 | Stenger |
| 4,412,414 A | 11/1983 | Novick et al. |
| 4,860,533 A | 8/1989 | Joshi |
| 4,912,931 A | 4/1990 | Joshi et al. |
| 5,085,040 A * | 2/1992 | Tilston .................... F23D 11/10 431/265 |
| 5,469,700 A | 11/1995 | Corbett et al. |
| 5,499,497 A | 3/1996 | Defreitas |

(Continued)

FOREIGN PATENT DOCUMENTS

| EP | 2677240 B1 | 4/2020 |
| GB | 819141 A | 8/1959 |
| GB | 859184 A | 1/1961 |

*Primary Examiner* — Edwin Kang
(74) *Attorney, Agent, or Firm* — Kinney & Lange, P.A.

(57) ABSTRACT

A torch ignitor system provides a continuous flame to ignite fuel within a combustor of a gas turbine engine. The torch ignitor system includes a torch ignitor, a housing, a flow channel, and an outlet nozzle. The torch ignitor system is configured to receive high-pressure air from the high-pressure compressor region of a gas turbine engine to increase operational characteristics of the torch ignitor system, including fuel atomization, cooling of the torch ignitor system, and circulation of combustion air within the torch ignitor system.

18 Claims, 4 Drawing Sheets

(56) References Cited

U.S. PATENT DOCUMENTS

| | | | |
|---|---|---|---|
| 5,636,511 A * | 6/1997 | Pfefferle | F01N 3/18 431/268 |
| 5,673,554 A | 10/1997 | Defreitas et al. | |
| 6,195,247 B1 | 2/2001 | Cote et al. | |
| 6,240,731 B1 | 6/2001 | Hoke et al. | |
| 6,247,300 B1 | 6/2001 | Muramatsu et al. | |
| 6,483,022 B1 | 11/2002 | Packard | |
| 6,884,967 B1 | 4/2005 | Leigh | |
| 6,952,927 B2 | 10/2005 | Howell et al. | |
| 6,968,699 B2 | 11/2005 | Howell et al. | |
| 7,124,724 B2 | 10/2006 | Fleetwood | |
| 7,137,255 B2 | 11/2006 | Schmotolocha et al. | |
| 7,216,488 B2 | 5/2007 | Howell et al. | |
| 7,470,875 B1 | 12/2008 | Wilcox et al. | |
| 7,481,248 B2 | 1/2009 | Prociw et al. | |
| 7,637,094 B2 | 12/2009 | Costello et al. | |
| 8,365,710 B2 | 2/2013 | Lykowski et al. | |
| 8,713,944 B2 | 5/2014 | Bleeker | |
| 9,080,772 B2 | 7/2015 | Prociw et al. | |
| 9,135,755 B2 | 9/2015 | Youssef | |
| 9,279,398 B2 | 3/2016 | McAlister | |
| 9,413,141 B2 | 8/2016 | Leglaye et al. | |
| 9,453,491 B2 | 9/2016 | Tanaka et al. | |
| 9,567,912 B2 | 2/2017 | Prociw et al. | |
| 10,156,189 B2 | 12/2018 | Sze et al. | |
| 10,488,047 B2 | 11/2019 | Ott et al. | |
| 10,584,639 B2 | 3/2020 | Dam et al. | |
| 2004/0168442 A1 | 9/2004 | Schmotolocha et al. | |
| 2005/0053876 A1 | 3/2005 | Joos et al. | |
| 2005/0166595 A1 | 8/2005 | Fletcher et al. | |
| 2006/0054233 A1 | 3/2006 | Prociw et al. | |
| 2008/0141651 A1 | 6/2008 | Eason et al. | |
| 2010/0071343 A1 | 3/2010 | Yu | |
| 2010/0126617 A1 | 5/2010 | Stroempl et al. | |
| 2012/0085468 A1 | 4/2012 | Walker | |
| 2013/0000323 A1 * | 1/2013 | Kupratis | F02C 3/107 60/801 |
| 2013/0040255 A1 | 2/2013 | Shi et al. | |
| 2013/0143171 A1 | 6/2013 | Soda et al. | |
| 2014/0150401 A1 * | 6/2014 | Venter | F02C 3/113 60/39.45 |
| 2014/0216384 A1 | 8/2014 | Tanaka et al. | |
| 2014/0366505 A1 | 12/2014 | Prociw et al. | |
| 2014/0366542 A1 | 12/2014 | Teets | |
| 2015/0275769 A1 * | 10/2015 | Foutch | F02C 7/27 60/776 |
| 2015/0308351 A1 | 10/2015 | Sheridan | |
| 2015/0345426 A1 | 12/2015 | Houston et al. | |
| 2015/0345788 A1 | 12/2015 | Miyata et al. | |
| 2016/0003150 A1 | 1/2016 | DiCintio et al. | |
| 2016/0010559 A1 * | 1/2016 | Hoke | F02C 7/25 60/752 |
| 2016/0047318 A1 | 2/2016 | Dam et al. | |
| 2016/0169110 A1 | 6/2016 | Myers et al. | |
| 2016/0230993 A1 | 8/2016 | Dai et al. | |
| 2017/0138266 A1 | 5/2017 | Caples | |
| 2017/0145852 A1 | 5/2017 | McCune et al. | |
| 2017/0284298 A1 * | 10/2017 | Suciu | F02K 3/065 |
| 2017/0350590 A1 | 12/2017 | Choudhri et al. | |
| 2018/0010795 A1 | 1/2018 | Nath et al. | |
| 2018/0134407 A1 * | 5/2018 | Elbibary | F02K 3/075 |
| 2018/0154446 A1 | 6/2018 | Brown et al. | |
| 2018/0170575 A1 | 6/2018 | Ziarno | |
| 2018/0172271 A1 | 6/2018 | Moniz et al. | |
| 2018/0179896 A1 * | 6/2018 | Pal | F01D 19/00 |
| 2018/0179956 A1 | 6/2018 | Wertz | |
| 2018/0283692 A1 | 10/2018 | Ryon et al. | |
| 2018/0356095 A1 | 12/2018 | Patel et al. | |
| 2019/0010872 A1 | 1/2019 | Dam et al. | |
| 2019/0032561 A1 | 1/2019 | Stoia et al. | |
| 2020/0191059 A1 | 6/2020 | Ryon et al. | |
| 2020/0309378 A1 | 10/2020 | Dam et al. | |
| 2020/0348024 A1 | 11/2020 | Hicks | |
| 2021/0215100 A1 | 7/2021 | Head et al. | |

* cited by examiner

HIGH-PRESSURE CONTINUOUS IGNITION DEVICE

BACKGROUND

The present disclosure relates to continuous ignition devices within gas turbine engines, and more particularly to high-pressure continuous ignition devices within gas turbine engines.

Torch ignitors can be used in lieu of spark ignitors to provide an ignition source for combustors located in gas turbine engines. Torch ignitors provide a flame to the combustion chamber of a gas turbine engine as an ignition source rather than the electric current provided by spark ignitors. Consequently, torch ignitors can provide a larger target for fuel injectors within the combustor, allowing for utilization of a greater range of fuel injector designs. Traditionally, torch ignitors mix low-pressure air with fuel to atomize the fuel before igniting the air and fuel mixture. The low-pressure air is pulled into the torch ignitor after the air exits the high-pressure compressor through a diffuser.

SUMMARY

According to one aspect of the disclosure, a torch ignitor system is used with a gas turbine engine including a high-pressure compressor region, a high-pressure case, and a combustor. The torch ignitor system includes a housing, a flow channel, a torch ignitor, and an outlet nozzle. The housing includes an outer case, an inner case, and an internal chamber. The flow channel includes a first end positioned within and fluidly connected to the high-pressure compressor region of the gas turbine engine and a second end coupled to and fluidly connected to the housing. The flow channel provides a flow path from the high-pressure compressor region to the housing. The torch ignitor is positioned at least partially within the internal chamber of the housing. The outlet nozzle is fluidly connected to the internal chamber of the housing and fluidly connected to the combustor of the gas turbine engine.

According to another aspect of the disclosure, a method of operating a torch ignitor system within a gas turbine engine is disclosed. The method includes receiving, by an internal chamber of a housing of the torch ignitor system, high-pressure air from a high-pressure compressor of the gas turbine engine; receiving, by the internal chamber, fuel from a fuel source; mixing the high-pressure air and the fuel into an air and fuel mixture within the internal chamber of the housing; igniting, by a torch ignitor of the torch ignitor system, the air and fuel mixture within the internal chamber of the housing; and expelling, by an outlet nozzle of the torch ignitor system, the ignited air and fuel mixture into a combustor of the gas turbine engine.

DETAILED DESCRIPTION

Figure 1A:
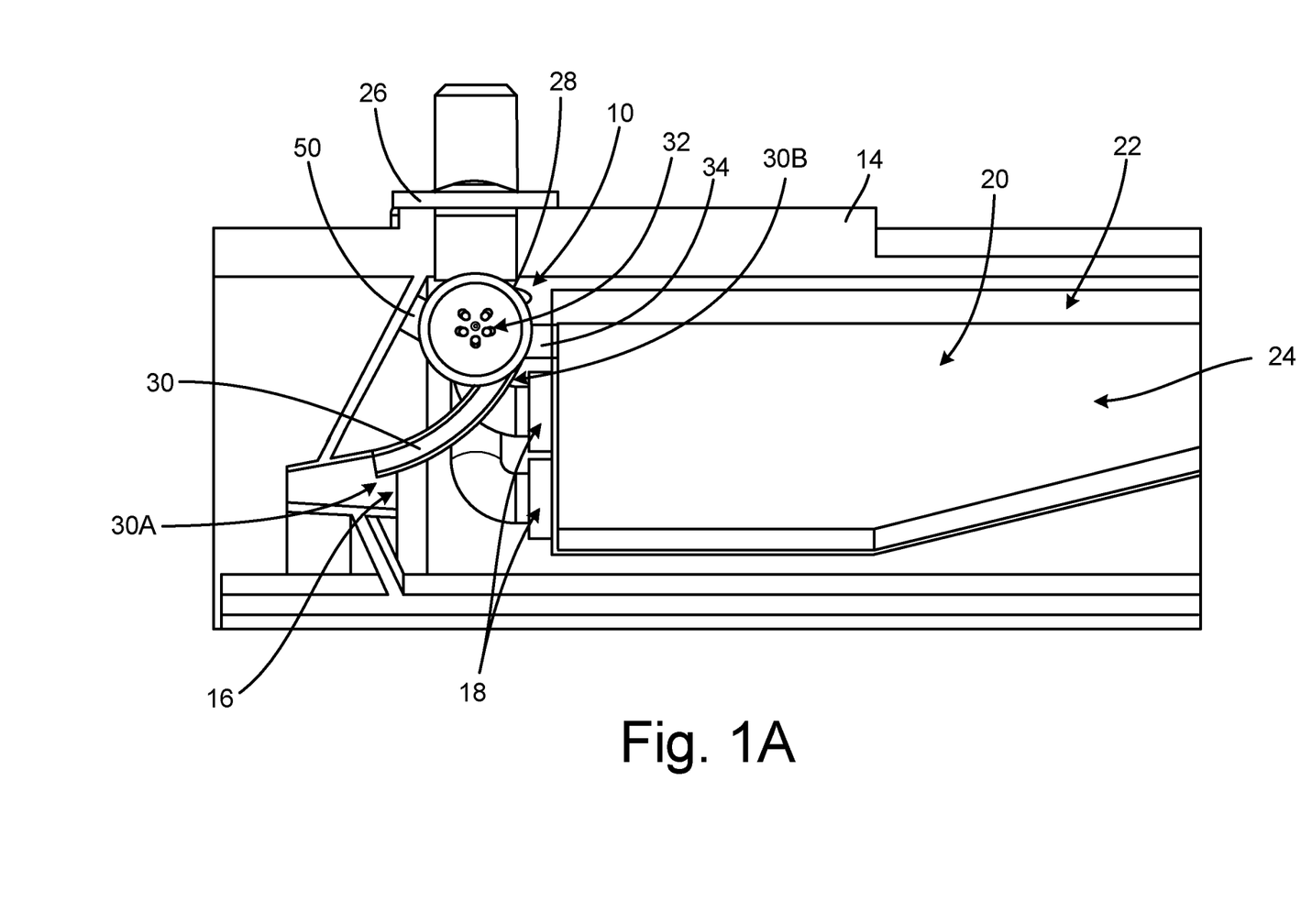
FIG. 1A is a first cross-sectional view of a torch ignitor system within a gas turbine engine.
Figure 1B:
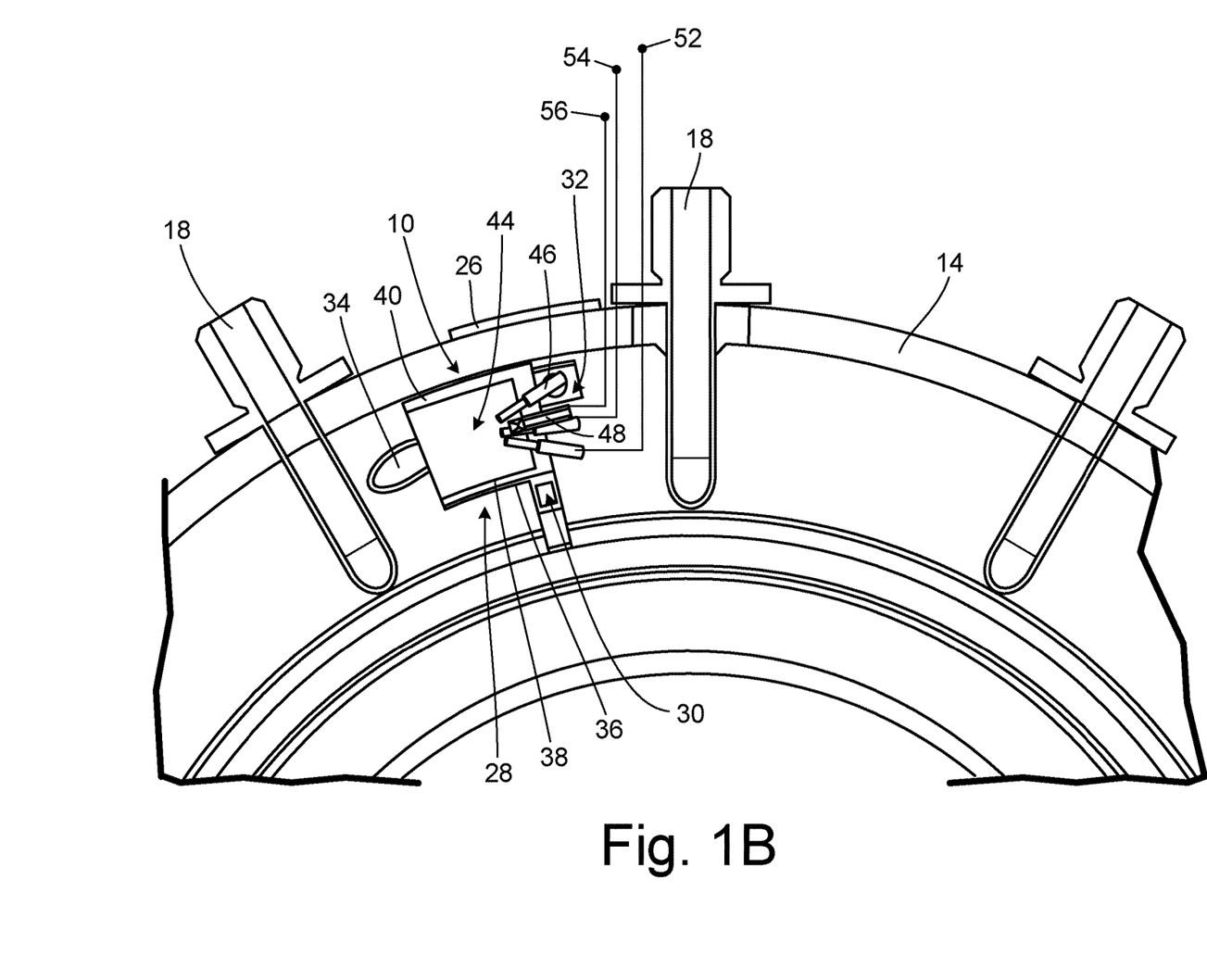
FIG. 1B is a second cross-sectional view of the torch ignitor system within a gas turbine engine.
Figure 1C:
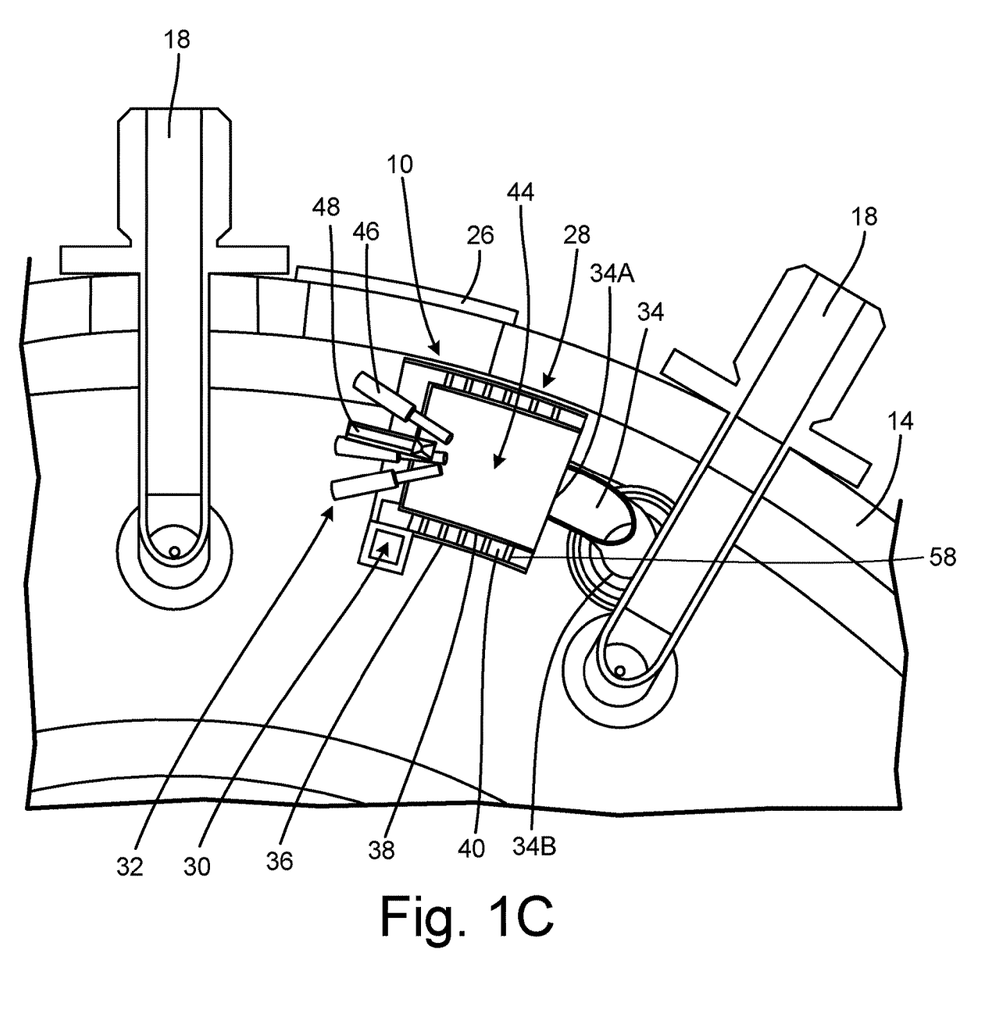
FIG. 1C is a third cross-sectional view of the torch ignitor system within a gas turbine engine.
Figure 1D:
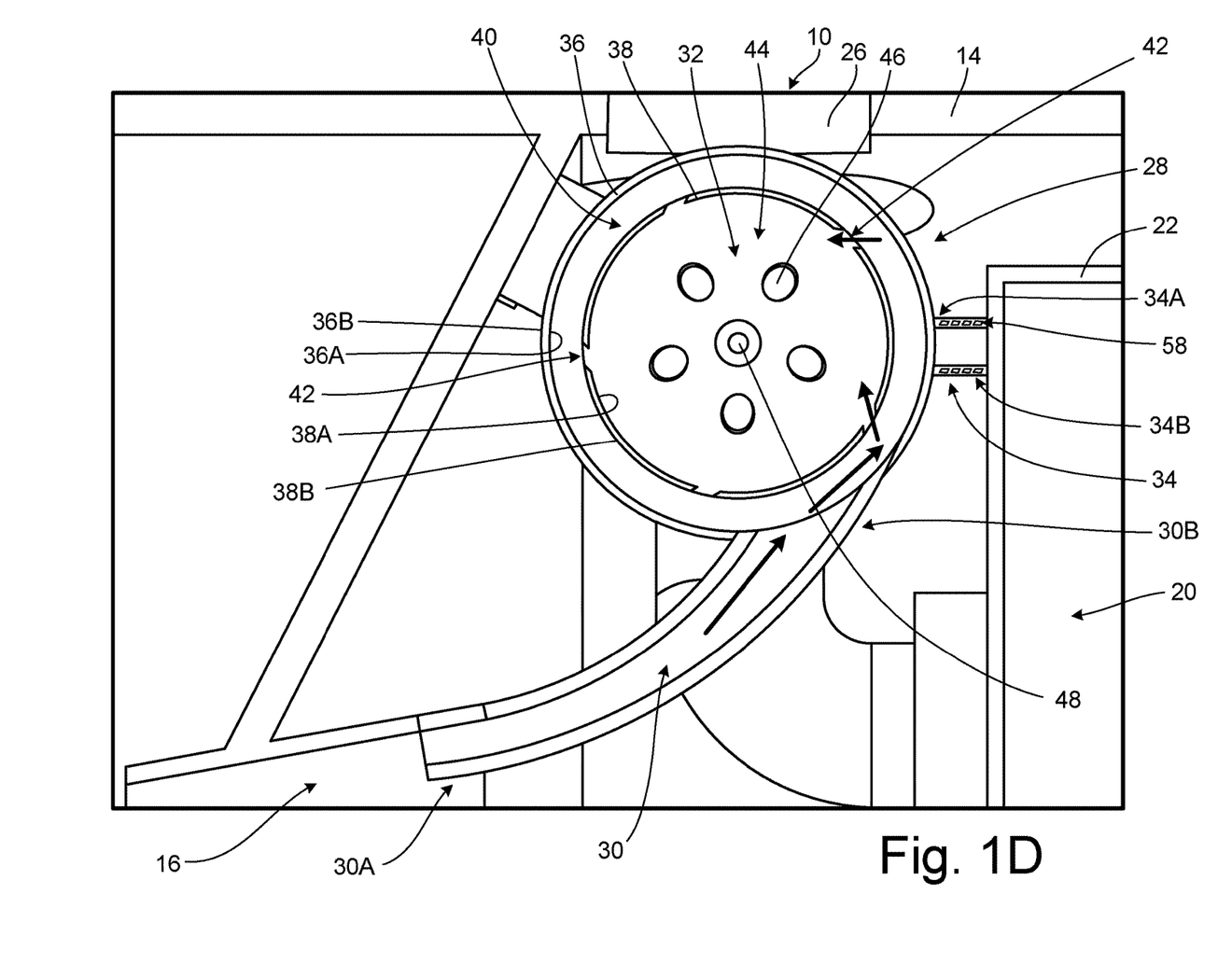
FIG. 1D is a cross-sectional view of a torch ignitor within the torch ignitor system.

FIG. 1A is a first cross-sectional view of torch ignitor system 10 within a gas turbine engine (not shown). FIG. 1B is a second cross-sectional view of torch ignitor system 10 within the gas turbine engine. FIG. 1C is a third cross-sectional view of torch ignitor system 10 within the gas turbine engine. FIG. 1D is a cross-sectional view of the internal structure of torch ignitor system 10. FIGS. 1A-1D will be discussed together. Torch ignitor system 10 is a high-pressure continuous ignition device used to ignite fuel within a combustor of the gas turbine engine.

FIG. 1A is a first cross-sectional view of torch ignitor system 10 within the gas turbine engine. More specifically, FIG. 1A is a cross-sectional view showing torch ignitor system 10 coupled to and positioned at least partially within the gas turbine engine. The gas turbine engine includes high-pressure case 14, high-pressure compressor 16 (also referred to as high-pressure compressor region 16), fuel nozzle 18, and combustor 20. High-pressure compressor 16, fuel nozzle 18, and combustor 20 are positioned within and fully contained by high-pressure case 14. Combustor 20 includes combustor liner 22 defining the external walls and an internal chamber of combustor 20. Combustor 20 also includes combustor outlet 24 which is utilized to expel an ignited fuel and air mixture from combustor 20 to be utilized to power the turbine section of the gas turbine engine. In operation, air is compressed within high-pressure compressor 16 to create high-pressure air, the high-pressure air flows from high-pressure compressor 16 into combustor 20 and mixes with fuel spraying from fuel nozzle 18 into combustor 20, the fuel and air mixture is ignited by torch ignitor system 10, and then the ignited fuel and air mixture is expelled through combustor outlet 24 to be utilized by the gas turbine engine.

Torch ignitor system 10 is positioned within high-pressure case 14 and adjacent high-pressure compressor 16, fuel nozzle 18, and combustor 20. More specifically, torch ignitor system 10 is positioned between high-pressure compressor 16 and combustor 20 and torch ignitor system 10 is fluidly connected to both high-pressure compressor 16 and combustor 20. In the embodiment shown, torch ignitor system 10 is positioned within high-pressure case 14 of the gas turbine engine. In another embodiment, torch ignitor system 10 can be positioned outside of high-pressure case 14 of the gas turbine engine. In yet another embodiment, torch ignitor system 10 can be positioned partially within high-pressure case 14 and partially outside of high-pressure case 14, such that a portion of torch ignitor system 10 is positioned within high-pressure case 14 and another portion of torch ignitor system 10 is positioned outside of high-pressure case 14. The remaining disclosure will focus on the embodiment in which torch ignitor system 10 is positioned within high-pressure case 14 of the gas turbine engine, as shown in FIGS. 1A-1D. The gas turbine engine also includes access hatch 26, which is a removable door or panel allowing access to torch ignitor system 10 when torch ignitor system 10 is positioned within high-pressure case 14 of the gas turbine engine. Access hatch 26 allows easy access to torch ignitor system 10 for repair and/or replacement of components of torch ignitor system 10.

Torch ignitor system 10 includes housing 28, flow channel 30, torch ignitor 32, and outlet nozzle 34. Housing 28 is the main body portion of torch ignitor system 10 and housing 28 provides structure for the other components of torch ignitor system 10 to be coupled. In the embodiment shown, housing 28 is generally cylindrical in shape. In another embodiment, housing 28 can have any geometric or non-geometric shape conforming to empty or open space within the gas turbine engine. Housing 28 can be coupled to a wall or surface of high-pressure compressor 16, high-pressure case 14, combustor liner 22, or any other rigid structure within the gas turbine engine. For example, as shown in FIGS. 1A and 1D, torch ignitor system 10 can include mounting flange 50 coupled to housing 28 and coupled to an inner wall of high-pressure compressor 16, securing housing 28 within the gas turbine engine. Housing 28 can be constructed from a nickel-chromium alloy, a nickel-chromium-iron-molybdenum alloy, a 300-series stainless steel alloy, or other high-temperature high-strength metallic or nonmetallic material that can withstand the high temperature environment within the gas turbine engine.

Housing 28 includes outer case 36, inner case 38, and gap 40 positioned between and separating outer case 36 from inner case 38. Outer case 36 is the exterior structure of housing 28 and outer case 36 is configured to encompass other components of torch ignitor system 10, such as inner case 38 and at least a portion of torch ignitor 32. Outer case 36 includes inner surface 36A and outer surface 36B. In the embodiment shown, outer case 36 is generally cylindrical in shape with an arc-shaped profile extending from an end surface of outer case 36 to an opposite end surface of outer case 36. In another embodiment, outer case 36 can have any geometric or non-geometric shape conforming to empty or open space within the gas turbine engine. Outer case 36 is a component of housing 28 and thus can be constructed from a nickel-chromium alloy, a nickel-chromium-iron-molybdenum alloy, a 300-series stainless steel alloy, or other high-temperature high-strength metallic or nonmetallic material that can withstand the high temperature environment within the gas turbine engine.

Inner case 38 is the interior structure of housing 28, with inner case 38 being positioned entirely within and mostly concentric with outer case 36 of housing 28. Inner case 38 is configured to receive and mix fuel and high-pressure air within a volume of inner case 38. Inner case 38 includes inner surface 38A, outer surface 38B, and swirler holes 42 (FIG. 1D). Inner case 38 is separated from outer case 36 by gap 40 positioned between inner surface 36A of outer case 36 and outer surface 38B of inner case 38. Gap 40 allows high-pressure air received from high-pressure compressor region 16 to flow tangentially around a central axis of outer case 36 and inner case 38, between inner surface 36A of outer case 36 and outer surface 38B of inner case 38, discussed further below. In the embodiment shown, inner case 38 is generally cylindrical in shape, similar to the shape of outer case 36, with an arc-shaped profile extending from an end surface of inner case 38 to an opposite end surface of inner case 38. In another embodiment, inner case 38 can have any geometric or non-geometric shape conforming to empty or open space within the gas turbine engine. Inner case 38 is a component of housing 28 and thus can be constructed from a nickel-chromium alloy, a nickel-chromium-iron-molybdenum alloy, a 300-series stainless steel alloy, or other high-temperature high-strength metallic or nonmetallic material that can withstand the high temperature environment within the gas turbine engine.

Inner case 38 includes inner surfaces 38A which define a volume within inner case 38, the volume being internal chamber 44. Internal chamber 44 is configured to receive and mix fuel and high-pressure air for ignition by torch ignitor 32. Inner case 38 also includes swirler holes 42 (FIG. 1D) extending through inner case 38 from outer surface 38B to inner surface 38A. Swirler holes 42 are apertures that extend through inner case 38 to allow high-pressure air to flow from gap 40 into internal chamber 44 of inner case 38. Swirler holes 42 extend through inner case 38 at angles to limit or reduce the pressure loss as the high-pressure air flows from gap 40 into internal chamber 44. More specifically, swirler holes 42 extend through inner case 38 at an oblique angle with respect to a tangential plane adjacent outer surface 38B of inner case 38 to limit or reduce the pressure loss as the high-pressure air flows from gap 40 into internal chamber 44, discussed further below. In the embodiment shown, there are five swirler holes 42 spaced equidistance about a circumference of inner case 38 and extending through inner case 38. In another embodiment, there can be more than or less than five swirler holes 42 extending through inner case 38. The number of swirler holes 42 and the size of swirler holes 42 can vary to achieve a proper fuel and air mixture for ignition by torch ignitor 32.

Flow channel 30 is a tube, passage, channel, or the like including a hollow center portion configured to allow fluid, such as air, to flow through flow channel 30. In the embodiment shown, flow channel 30 is a rectangular tube with a hollow center portion. In another embodiment, flow channel 30 can be a tube of any geometric shape with a hollow center portion allowing a fluid, such as air, to flow through the hollow center portion. Flow channel 30 can be constructed from a nickel-chromium alloy, a nickel-chromium-iron-molybdenum alloy, a 300-series stainless steel alloy, or other high-temperature high-strength metallic or nonmetallic material that can withstand the high temperature environment within the gas turbine engine. Flow channel 30 includes first end 30A and second end 30B positioned at the opposite end of flow channel 30 as first end 30A.

First end 30A of flow channel 30 is positioned adjacent and at least partially within an exit or diffuser of high-pressure compressor region 16. Second end 30B of flow channel 30 is adjacent and coupled to outer case 36 of housing 28. Flow channel 30 is in fluid communication with both high-pressure compressor region 16 and housing 28, fluidly connecting high-pressure compressor region 16 to housing 28. More specifically, flow channel 30 is configured to provide a flow passage or flow path for a fluid, such as air, to flow from high-pressure compressor region 16 through flow channel 30 and into housing 28. As such, flow channel 30 is configured to allow high-pressure air within high-pressure compressor region 16 to flow from high-pressure compressor region 16 directly into housing 28 of torch ignitor system 10. High-pressure air is routed directly from high-pressure compressor 16 into housing 28 to maximize air pressure within housing 28 of torch ignitor system 10, which increases atomization of fuel, improves fuel-air mixing, and increases cooling of torch ignitor system 10, among other advantages. The high-pressure air flowing from high-pressure compressor region 16 directly into housing 28 can then be mixed with fuel and ignited by torch ignitor 32 to be utilized by the gas turbine engine.

As shown in FIG. 1D, second end 30B of flow channel 30 is offset from swirler holes 42, such that high-pressure air flowing from second end 30B of flow channel 30 engages outer surface 38B of inner case 38 before flowing through swirler holes 42 and into internal chamber 44 of housing 28. Second end 30B of flow channel 30 is offset from swirler holes 42 because it allows air entering from flow channel 30 to cool the inner case 38 prior to entering combustion chamber 44. Cooling of inner case 38 prevents excessive heat within combustion chamber 44 from melting inner case 38. Further, the angle of flow channel 30 and angles in which swirler holes 42 extend through inner case 38 are similar angles that allow high-pressure air from high-pressure compressor 16 to flow into gap 40 of housing 28 and then through swirler holes 42 while minimizing pressure loss within torch ignitor system 10. In other words, the angles of flow channel 30 and swirler holes 42 are configured to allow high-pressure air to easily flow into gap 40, swirl or flow around housing 28 within gap 40, and then flow through swirler holes 42 with minimal reduction in air velocity of the flowing high-pressure air, minimizing pressure loss within torch ignitor system 10. Maximizing the swirling effect of high-pressure air and minimizing pressure loss within torch ignitor system 10 causes the high-pressure air to maintain a swirling flow within housing 28, which in turn creates a self-sustaining flame of an ignited fuel and high-pressure air mixture within internal chamber 44 of torch ignitor system 10.

As best shown in FIGS. 1B and 1C, torch ignitor 32 is coupled to outer case 36 of housing 28 and torch ignitor 32 is positioned at least partially within internal chamber 44 of housing 28. Torch ignitor 32 includes hot surface ignitors 46 and fuel injector 48. In the embodiment shown, there are five hot surface ignitors 46 surrounding fuel injector 48. In another embodiment, there can be more than or less than five hot surface ignitors 46 surrounding fuel injector 48. As shown in FIGS. 1B-1C, hot surface ignitors 46 are coupled to housing 28 with a portion of hot surface ignitors 46 positioned within internal chamber 44 and another portion of hot surface ignitors 46 positioned outside of housing 28. Hot surface ignitors 46 are electrical resistance heating elements that are configured to receive a positive and negative electric charge in the form of an electric current, from electricity source 52, to increase the temperature of the element due to the resistive properties of the electrical resistance heating elements. In some examples, hot surface ignitors 46 can be constructed from a ceramic material with resistive properties allowing hot surface ignitors 46 to achieve a temperature that exceeds the combustion temperature of the fuel and air mixture within internal chamber 44 of housing 28.

Fuel injector 48 of torch ignitor 32 is surrounded by hot surface ignitors 46 and fuel injector 48 is coupled to housing 28. More specifically, a portion of fuel injector 48 is positioned within internal chamber 44 and another portion of fuel injector 48 is positioned outside of housing 28. Fuel injector 48 is a component that is configured to distribute or spray fuel into internal chamber 44 adjacent hot surface ignitors 46 for ignition by hot surface ignitors 46. The portion of fuel injector 48 positioned outside of housing 28 is configured to receive fuel from fuel source 54 and the portion of fuel injector 48 positioned within internal chamber 44 is configured to distribute or spray the received fuel into internal chamber 44. In the embodiment shown, fuel injector 48 receives fuel from the main fuel source that supplies fuel to fuel nozzles 18 to be ignited within combustor 20. In another embodiment, fuel injector 48 can receive fuel from a separate fuel source that does not supply fuel to fuel nozzles 18, such as in an example where the fuel used within torch ignitor system 10 is a different fuel than the fuel used with fuel nozzle 18 and combustor 20. Additionally, high pressure air can be supplied directly to fuel injector 48 from an external high-pressure air source 56, such as an external air compressor. The high-pressure air can aid in atomization of the fuel, particularly during startup of the gas turbine engine when air flowing from compressor 16 is inadequate to atomize fuel within torch ignitor system 10.

Outlet nozzle 34 is a tube, passage, channel, or the like including a hollow center portion configured to allow an ignited air and fuel mixture to flow through outlet nozzle 34. In the embodiment shown, outlet nozzle 34 is a circular tube with a circular cross-section and a hollow center portion. In another embodiment, outlet nozzle 34 can be a tube of any geometric shape with a hollow center portion allowing an ignited air and fuel mixture to flow through the hollow center portion. Outlet nozzle 34 can be constructed from a nickel-chromium alloy, a nickel-chromium-iron-molybdenum alloy, a 300-series stainless steel alloy, or other high-temperature high-strength metallic or nonmetallic material that can withstand the high temperature environment within the gas turbine engine. Outlet nozzle 34 includes first end 34A and second end 34B positioned at the opposite end of outlet nozzle 34 as first end 34A.

First end 34A of outlet nozzle 34 is positioned adjacent and coupled to housing 28 and first end 34A is fluidly connected to internal chamber 44 of housing 28. Second end 34B of outlet nozzle 34 is positioned adjacent and coupled to combustor liner 22 of combustor 20. Second end 34B of outlet nozzle 34 is fluidly coupled to an interior of combustor 20 of the gas turbine engine. Outlet nozzle 34 is fluidly connected to both internal chamber 44 of torch ignitor system 10 and combustor 20 of the gas turbine engine. Therefore, outlet nozzle 34 is configured to provide a flow passage or flow path for an ignited fuel and air mixture to flow from internal chamber 44 of housing 28 through outlet nozzle 34 and into combustor 20 of the gas turbine engine. The ignited fuel and air mixture that flows from outlet nozzle 34 into combustor 20 is configured to ignite the fuel dispensing from fuel nozzle 18 into combustor 20, resulting in an ignited fuel and air mixture within combustor 20 to be utilized by the gas turbine engine for various purposes.

Housing 28, flow channel 30, and outlet nozzle 34 can each include cooling vanes 58 (FIGS. 1C and 1D) within each of their outer walls. More specifically, the outer walls of each of housing 28, flow channel 30, and outlet nozzle 34 can include an inner and outer skin with a plurality of vanes 58 positioned between the inner and outer skin. The plurality of vanes 58 can be oriented such that a fluid flow path exists between the inner and outer skin, allowing a fluid (i.e. high-pressure air) to flow through the outer walls and past the plurality of vanes 58. In an example, high-pressure air received from high-pressure compressor 16 can flow past cooling vanes 58 and remove heat from housing 28, flow channel 30, and/or outlet nozzle 34, thereby cooling housing 28, flow channel 30, and/or outlet nozzle 34. In one example, the high-pressure air flowing past cooling vanes 58 can be about 1,000 degrees Fahrenheit and the temperature within internal chamber 44 can be about 3,000 degrees Fahrenheit. Therefore, the lower temperature high-pressure air can remove heat from housing 28 and/or outlet nozzle 34 to prevent deformation or damage to housing 28 and/or outlet nozzle 34. In an embodiment including cooling vanes 58, housing 28, flow channel 30, and outlet nozzle 34 can be manufactured using additive manufacturing technology to produce the intricate or complex geometry of cooling vanes 58 within the outer walls of each respective component. In an embodiment without cooling vanes 58, housing 28, flow channel 30, and outlet nozzle 34 can be manufactured using standard manufacturing techniques.

In operation, high-pressure compressor 16 of the gas turbine engine rotates and creates high-pressure air, a portion of the high-pressure air flows through flow channel 30 from first end 30A to second end 30B and into housing 28. The high-pressure air automatically flows into flow channel 30 due to the air pressure drop between high-pressure compressor 16 and the internal cavity of combustor 20. Specifically, the air pressure within combustor 20 is lower than the air pressure within high-pressure compressor region 16, causing the high-pressure air to be pulled into and through flow channel 30 and then into housing 28. The high-pressure air entering housing 28 flows from second end 30B of flow channel 30 into gap 40 of housing 28. As discussed, second end 30B of flow channel 30 is offset from swirler holes 42, such that high-pressure air flowing into housing 28 first contacts outer surface 38B of inner case 38 before swirling or flowing around housing 28 through gap 40.

The high-pressure air entering housing 28 swirls or flows around housing 28 through gap 40 in a tangential direction around a central axis of outer case 36 and inner case 38, with portions of the high-pressure air entering swirler holes 42 as the high-pressure air swirls or flows around housing 28 through gap 40. The high-pressure air flows through swirler holes 42 and into internal chamber 44 of inner case 38 of housing 28, wherein the high-pressure air mixes with fuel that is sprayed into internal chamber 44 by fuel injector 48. More specifically, the high-pressure air entering internal chamber 44 atomizes the fuel sprayed by fuel injector 48 within internal chamber 44, creating a fuel and high-pressure air mixture. The fuel and high-pressure air mixture swirls within internal chamber 44 and is ignited by torch ignitor 32. Hot surface ignitors 46 of torch ignitor 32 increase to a temperature above the ignition temperature of the fuel and high-pressure air mixture, igniting the fuel and high-pressure air mixture within internal chamber 44. Swirl holes 42 provide a recirculation zone within internal chamber 44 which creates a self-sustaining flame capable of functioning without the need for further energy input from hot surface ignitors 46, allowing hot surface ignitors 46 to be turned off after ignition of the fuel and high-pressure air mixture.

The ignited fuel and high-pressure air mixture flows from internal chamber 44, through outlet nozzle 34, and into combustor 20 of the gas turbine engine. The ignited fuel and high-pressure air mixture automatically flows from internal chamber 44 into combustor 20 due to the pressure drop between internal chamber 44 and combustor 20. The pressure within combustor 20 is less than the pressure within internal chamber 44, causing the ignited fuel and high-pressure air mixture to be pulled through outlet nozzle 34 into combustor 20. The ignited fuel and high-pressure air mixture enters combustor 20 adjacent one or more fuel nozzles 18, which are configured to spray fuel into combustor 20. The ignited fuel and high-pressure air mixture is configured to ignite the fuel spraying from one or more fuel nozzles 18, causing combustor 20 to ignite and transition into an operational state. Torch ignitor system 10 provides a continuous heat source and an independent heat source to combustor 20, igniting, stabilizing, and relighting the fuel and high-pressure air mixture within combustor 20 of the gas turbine engine.

FIGS. 1A-1D illustrate only a portion of high-pressure compressor 16 and combustor 20 of the gas turbine engine, and therefore only a single torch ignitor system 10 is shown within the gas turbine engine. It is to be understood that the gas turbine engine can include more than one torch ignitor system 10 within the gas turbine engine, with each torch ignitor system 10 fluidly connected to high-pressure compressor 16 and combustor 20. In one example, the gas turbine engine can include two systems 10 within the gas turbine engine, with each torch ignitor system 10 fluidly connected to high-pressure compressor 16 and combustor 20. In another example, the gas turbine engine can include more than two systems 10 within the gas turbine engine, with each torch ignitor system 10 fluidly connected to high-pressure compressor 16 and combustor 20. The gas turbine engine can include more than one torch ignitor system 10 for redundancy purposes, specifically to ensure all the fuel sprayed by fuel nozzles 18 into combustor 20 is ignited for use by the gas turbine engine. Further, in the embodiment shown, outlet nozzle 34 of torch ignitor system 10 is positioned adjacent fuel nozzle 18 of the gas turbine engine. In another embodiment, outlet nozzle 34 of torch ignitor system 10 can be positioned away from fuel nozzle 18 of the gas turbine engine in a location between two fuel nozzles 18 that still allows the ignited fuel and air mixture exiting outlet nozzle 34 to ignite the fuel spraying from fuel nozzle 18.

Torch ignitor system 10 offers many advantages for the gas turbine engine, as compared to traditional spark ignitors, that will be appreciated by those familiar with ignition techniques of gas turbine engines. Torch ignitor system 10 provides an independent heat source to combustor 20, which is used to ignite, stabilize, and relight a fuel and air mixture within combustor 20. The continuous flame of torch ignitor system 10 is maintained within internal chamber 44 of torch ignitor system 10 during operation of the gas turbine engine. Therefore, the isolated continuous flame of torch ignitor system 10 is not affected by any blow out or other conditions that may occur within combustor 20, thus stabilizing the gas turbine engine during any disturbances that may occur within combustor 20. The continuous torch or flame of torch ignitor system 10 allows torch ignitor system 10 to rapidly relight the fuel and air mixture within combustor 20 if combustor 20 is extinguished. In contrast, traditional spark ignitors can have issues of contamination of the tip of the spark ignitor with burnt debris, causing the spark ignitor to fail to produce a spark to ignite the fuel and air mixture. Therefore, the continuous flame or torch of torch ignitor system 10 is a more reliable solution that will have an increased useful lifespan, as compared to traditional spark ignitors, due to minimizing failures and maintenance of the ignitor.

Further, directly feeding high-pressure air from high-pressure compressor 16 into housing 28 provides the benefit of increasing fuel atomization within internal chamber 44 of housing 28. Increased fuel atomization creates a fine mist of fuel that is easier to ignite than a droplet or stream of fuel, resulting in a more efficient ignitor system within the gas turbine engine. Likewise, directly feeding high-pressure air from high-pressure compressor 16 into housing 28 provides the benefit of increased cooling of torch ignitor system 10. As discussed, housing 28, flow channel 30, and outlet nozzle 34 can each include cooling vanes 58 within outer walls of each respective component. The high-pressure air received from high-pressure compressor 16 can flow past cooling vanes 58 of each of housing 28, flow channel 30, and outlet nozzle 34 and remove heat from each respective component. Therefore, the high-pressure air can be utilized to increase cooling of components of torch ignitor system 10, preventing deformation and damage to the components and increasing the useful lifespan of the components. Torch ignitor system 10 offers many other advantages not specifically described, that will be appreciated by those familiar with ignition techniques of gas turbine engines.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

DISCUSSION OF POSSIBLE EMBODIMENTS

The following are non-exclusive descriptions of possible embodiments of the present invention.

A torch ignitor system is used with a gas turbine engine including a high-pressure compressor region, a high-pressure case, and a combustor. The torch ignitor system includes a housing, a flow channel, a torch ignitor, and an outlet nozzle. The housing includes an outer case, an inner case, and an internal chamber. The flow channel includes a first end positioned within and fluidly connected to the high-pressure compressor region of the gas turbine engine and a second end coupled to and fluidly connected to the housing. The flow channel provides a flow path from the high-pressure compressor region to the housing. The torch ignitor is positioned at least partially within the internal chamber of the housing. The outlet nozzle is fluidly connected to the internal chamber of the housing and fluidly connected to the combustor of the gas turbine engine.

The torch ignitor system of the preceding paragraph can optionally include, additionally and/or alternatively, any one or more of the following features, configurations and/or additional components:

The housing is positioned adjacent the high-pressure compressor region of the gas turbine engine; the housing is positioned adjacent the combustor of the gas turbine engine; and the housing is positioned between the high-pressure compressor region and the combustor of the gas turbine engine.

The housing, the flow channel, the torch ignitor, and the outlet nozzle are positioned within the high-pressure case of the gas turbine engine.

The torch ignitor includes at least one hot surface ignitor configured to ignite a fuel and air mixture within the internal chamber of the housing.

The at least one hot surface ignitor is a resistance heating element configured to exceed a combustion temperature of the fuel and air mixture within the internal chamber of the housing.

A gap is located between the outer case and the inner case of the housing, and wherein the gap allows high-pressure air received from the high-pressure compressor region to flow in a circular motion between an inner surface of the outer case and an outer surface of the inner case.

The inner case includes a plurality of swirler holes extending through the inner case; the plurality of swirler holes are spaced equidistance about a circumference of the inner case; and the plurality of swirler holes extend through the inner case at an oblique angle with respect to a tangential plane adjacent an outer surface of the inner case.

The second end of the flow channel is offset from the swirler holes, such that high-pressure air flowing from the second end of the flow channel engages the inner case before flowing through the swirler holes into the internal chamber of the housing.

The outer case of the housing has a cylindrical shape and the inner case of the housing has a cylindrical shape, and wherein the outer case of the housing is positioned concentric with the inner case of the housing.

The torch ignitor is configured to ignite a fuel and air mixture within the internal chamber of the housing, and wherein the outlet nozzle is configured to expel the ignited fuel and air mixture into the combustor of the gas turbine engine.

A method of operating a torch ignitor system within a gas turbine engine is disclosed. The method includes receiving, by an internal chamber of a housing of the torch ignitor system, high-pressure air from a high-pressure compressor of the gas turbine engine; receiving, by the internal chamber, fuel from a fuel source; mixing the high-pressure air and the fuel into an air and fuel mixture within the internal chamber of the housing; igniting, by a torch ignitor of the torch ignitor system, the air and fuel mixture within the internal chamber of the housing; and expelling, by an outlet nozzle of the torch ignitor system, the ignited air and fuel mixture into a combustor of the gas turbine engine.

The method of the preceding paragraph can optionally include, additionally and/or alternatively, any one or more of the following features, configurations and/or additional components:

The high-pressure air and fuel into an air and fuel mixture within the internal chamber of the housing further comprises mixing the high-pressure air and fuel such that the fuel atomizes, producing a self-sustaining flame.

The high-pressure air and fuel into an air and fuel mixture within the internal chamber of the housing further comprises: swirling the high-pressure air around the housing in a gap between an outer case and an inner case; wherein the swirling high-pressure air flows from the gap through a plurality of swirler holes into the internal chamber of the housing.

The internal chamber of the housing is defined by an inner surface of the inner case, and wherein the plurality of swirler holes are spaced equidistance about a circumference of the inner case.

Cooling, by the high-pressure air, the housing of the torch ignitor system by flowing the high-pressure air through vanes positioned within an outer case of the housing.

The torch ignitor system is continuously ignited during operation of the gas turbine engine to relight fuel within the combustor of the gas turbine engine after a loss of ignition of the fuel within the combustor.

The receiving, by an internal chamber of a housing of the torch ignitor system, high-pressure air from a high-pressure compressor of the gas turbine engine comprises: flowing the high-pressure air from the high-pressure compressor through a flow channel connecting the high-pressure compressor to the housing; and flowing the high-pressure air into the internal chamber of the housing of the torch ignitor system.

The flow channel includes a first end positioned within and fluidly connected to the high-pressure compressor and a second end coupled to and fluidly connected to the housing.

The torch ignitor is positioned at least partially within the internal chamber of the housing; the torch ignitor includes at least one hot surface ignitor configured to ignite the fuel and air mixture within the internal chamber of the housing; and the at least one hot surface ignitor is a resistance heating element configured to exceed a combustion temperature of the fuel and air mixture within the internal chamber of the housing.

The housing, the torch ignitor, and the outlet nozzle are positioned within a high-pressure case of the gas turbine engine.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A torch ignitor system for use with a gas turbine engine including a high-pressure compressor region, a high-pressure case, and a combustor, the torch ignitor system comprising:
   a housing comprising an outer case, an inner case, and an internal chamber;
   a flow channel including:
      a first end positioned within and fluidly connected to the high-pressure compressor region of the gas turbine engine; and
      a second end coupled to and fluidly connected to the housing;
      wherein the flow channel provides a flow path from the high-pressure compressor region to the housing;
   a torch ignitor positioned at least partially within the internal chamber of the housing; and
   an outlet nozzle fluidly connected to the internal chamber of the housing and fluidly connected to the combustor of the gas turbine engine.

2. The torch ignitor system of claim 1, wherein:
   the housing is positioned adjacent the high-pressure compressor region of the gas turbine engine;
   the housing is positioned adjacent the combustor of the gas turbine engine; and
   the housing is positioned between the high-pressure compressor region and the combustor of the gas turbine engine.

3. The torch ignitor system of claim 1, wherein the housing, the flow channel, the torch ignitor, and the outlet nozzle are positioned within the high-pressure case of the gas turbine engine.

4. The torch ignitor system of claim 1, wherein the torch ignitor includes at least one hot surface ignitor configured to ignite a fuel and air mixture within the internal chamber of the housing.

5. The torch ignitor system of claim 4, wherein the at least one hot surface ignitor is a resistance heating element configured to exceed a combustion temperature of the fuel and air mixture within the internal chamber of the housing.

6. The torch ignitor system of claim 1, wherein a gap is located between the outer case and the inner case of the housing, and wherein the gap allows high-pressure air received from the high-pressure compressor region to flow in a circular motion between an inner surface of the outer case and an outer surface of the inner case.

7. The torch ignitor system of claim 6, wherein:
   the inner case includes a plurality of swirler holes extending through the inner case;
   the plurality of swirler holes are spaced equidistant about a circumference of the inner case; and
   the plurality of swirler holes extend through the inner case at an oblique angle with respect to a tangential plane adjacent the outer surface of the inner case.

8. The torch ignitor system of claim 7, wherein the second end of the flow channel is offset from the plurality of swirler holes, such that the high-pressure air flowing from the second end of the flow channel engages the inner case before flowing through the plurality of swirler holes into the internal chamber of the housing.

9. The torch ignitor system of claim 1, wherein:
   the outer case of the housing has a cylindrical shape and the inner case of the housing has a cylindrical shape;
   the outer case and inner case include an arc-shaped profile extending from an end surface to an opposite end surface; and
   the outer case of the housing is positioned concentric with the inner case of the housing.

10. The torch ignitor system of claim 1, wherein the torch ignitor is configured to ignite a fuel and air mixture within the internal chamber of the housing, and wherein the outlet nozzle is configured to expel the fuel and air mixture into the combustor of the gas turbine engine.

11. A method of operating a torch ignitor system within a gas turbine engine, the method comprising:
   receiving, by an internal chamber of a housing of the torch ignitor system, high-pressure air from a high-pressure compressor of the gas turbine engine, wherein a flow channel comprises a first end positioned within the high-pressure compressor and a second end coupled to the housing, and wherein the flow channel fluidly couples the high-pressure compressor to the internal chamber of the housing;
   receiving, by the internal chamber, fuel from a fuel injector;
   mixing the high-pressure air and the fuel into a fuel and air mixture within the internal chamber of the housing;
   igniting, by a torch ignitor of the torch ignitor system, the fuel and air mixture within the internal chamber of the housing; and
   expelling, by an outlet nozzle of the torch ignitor system, the fuel and air mixture into a combustor of the gas turbine engine;
   wherein receiving, by the internal chamber of the housing of the torch ignitor system, the high-pressure air from the high-pressure compressor of the gas turbine engine comprises:
   flowing the high-pressure air from the high-pressure compressor through the flow channel connecting the high-pressure compressor to the housing; and
   flowing the high-pressure air into the internal chamber of the housing of the torch ignitor system.

12. The method of claim 11, wherein mixing the high-pressure air and the fuel into the fuel and air mixture within the internal chamber of the housing further comprises mixing the high-pressure air and the fuel such that the fuel atomizes, producing a self-sustaining flame.

13. The method of claim 11, wherein mixing the high-pressure air and the fuel into the fuel and air mixture within the internal chamber of the housing further comprises:
   swirling the high-pressure air around the housing in a gap between an outer case and an inner case;
   wherein the high-pressure air flows from the gap through a plurality of swirler holes into the internal chamber of the housing.

14. The method of claim 13, wherein the internal chamber of the housing is defined by an inner surface of the inner case, and wherein the plurality of swirler holes are spaced equidistant about a circumference of the inner case.

15. The method of claim 11, and further comprising cooling, by the high-pressure air, the housing of the torch ignitor system by flowing the high-pressure air through cooling vanes positioned within an outer case of the housing.

16. The method of claim 11, wherein the torch ignitor system is continuously ignited during operation of the gas turbine engine to relight a second fuel within the combustor of the gas turbine engine after a loss of ignition of the second fuel within the combustor.

17. The method of claim 11, wherein:
   the torch ignitor is positioned at least partially within the internal chamber of the housing;
   the torch ignitor includes at least one hot surface ignitor configured to ignite the fuel and air mixture within the internal chamber of the housing; and
   the at least one hot surface ignitor is a resistance heating element configured to exceed a combustion temperature of the fuel and air mixture within the internal chamber of the housing.

18. The method of claim 11, wherein the housing, the torch ignitor, and the outlet nozzle are positioned within a high-pressure case of the gas turbine engine.

\* \* \* \* \*